US006661998B1

(12) United States Patent
Hunzinger et al.

(10) Patent No.: US 6,661,998 B1
(45) Date of Patent: Dec. 9, 2003

(54) MOBILE STATION TO BASE STATION COMMUNICATION AND SIGNAL ACKNOWLEDGEMENT

(75) Inventors: Jason F. Hunzinger, Carlsbad, CA (US); Mark W. Cheng, San Diego, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/469,424

(22) Filed: Dec. 23, 1999

(51) Int. Cl.$^7$ .............................. H04Q 7/20; H04B 1/00; H04M 11/00
(52) U.S. Cl. ........................ 455/68; 455/422; 455/412.1; 455/414.1; 455/517; 370/451; 379/93.08
(58) Field of Search ............................... 455/68, 69, 70, 455/412.1, 422, 517, 3.01, 3.05, 414.2; 370/451, 320, 342, 470–472; 340/825.5; 379/93.08, 1.03, 1.04

(56) References Cited

U.S. PATENT DOCUMENTS

| | | | | |
|---|---|---|---|---|
| 5,027,356 A | * | 6/1991 | Nakamura et al. ............. 371/32 |
| 5,586,118 A | * | 12/1996 | Hashimoto et al. ......... 370/451 |
| 5,896,402 A | * | 4/1999 | Kurobe et al. ................ 371/32 |
| 6,067,534 A | * | 5/2000 | Terho et al. .................... 706/2 |
| 6,088,342 A | * | 7/2000 | Cheng et al. ................ 370/320 |
| 6,272,332 B1 | * | 8/2001 | Matsumoto et al. ........ 455/412 |

* cited by examiner

*Primary Examiner*—Duc Nguyen
(74) *Attorney, Agent, or Firm*—Harness, Dickey & Pierce, PLC

(57) ABSTRACT

A retransmission value in a digital cellular phone is negotiated using information from the cellular phone, sent to the network.

18 Claims, 3 Drawing Sheets

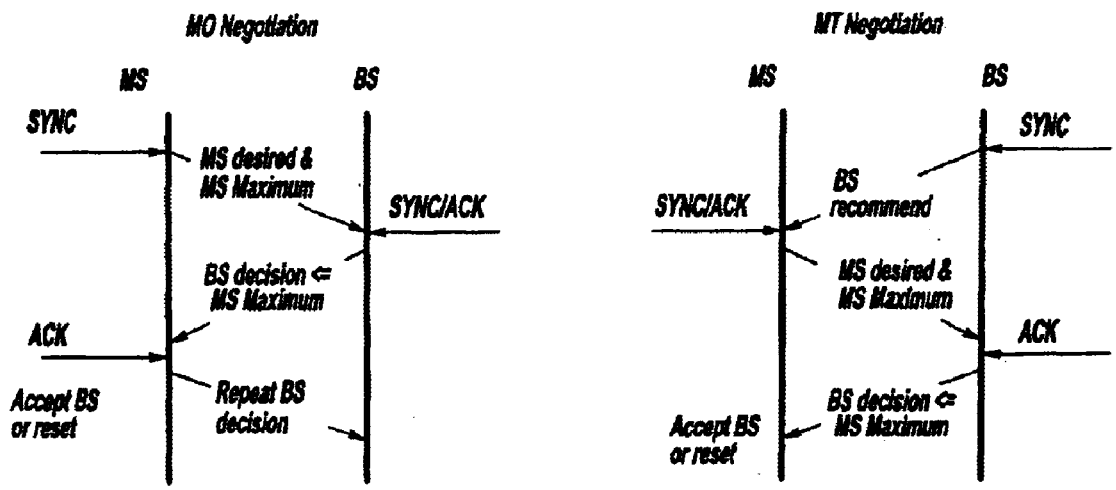
FIG - 3A  FIG - 3B
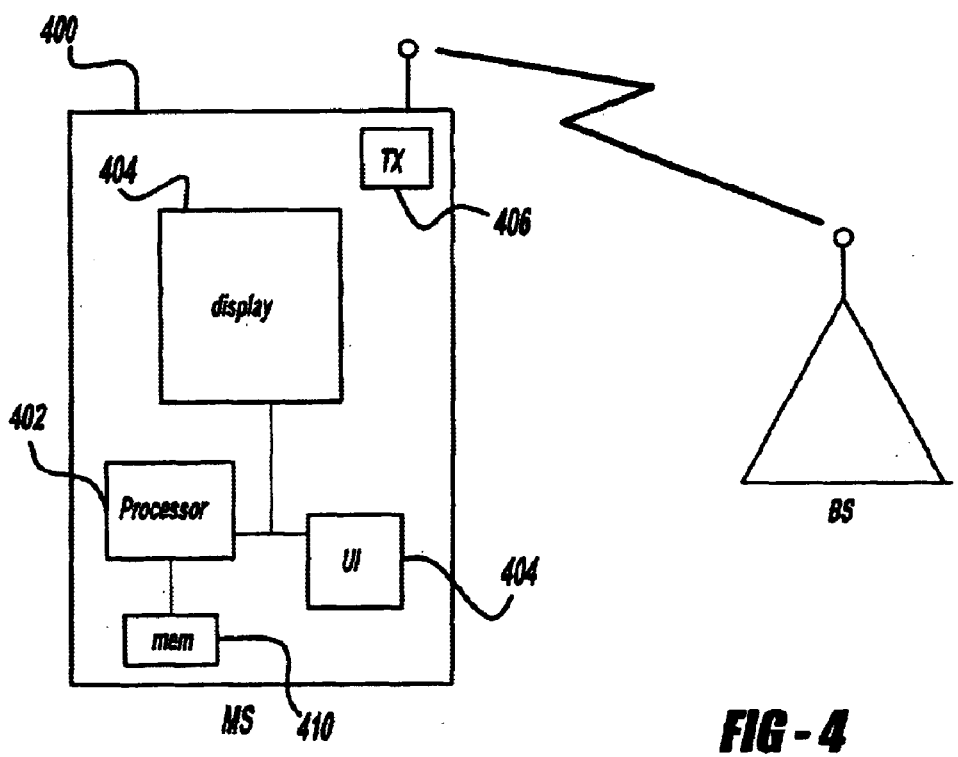
FIG - 4

MOBILE STATION TO BASE STATION COMMUNICATION AND SIGNAL ACKNOWLEDGEMENT

BACKGROUND

In a digital telephone system, the mobile station (MS) and base station (BS) communicate with one another. A negative acknowledgement or "NAK" system is used by certain standards, e.g., IS 770, to allow the receiver of a signal to request retransmission if this signal was incorrectly received. For example, an incorrect reception can be detected by a cyclic redundancy code (CRC) that is transmitted with each packet of signals.

The receiver of the signals can be the mobile station or the base station. This receiver holds a number of packets of signals in memory. The receiver then orders the packets in the correct order, and decodes them.

If one or more signals in this group is faulty, the system may request that signal to be retransmitted.

The allowable number of retransmissions is set during a telephone setup. For example, this number may range between, only zero retransmissions, and ten retransmissions. The allowable number of transmissions effects the delay sensitivity and frame error rate.

The number of retransmissions affects many things. If the number of retransmissions is low, the memory requirements in the mobile station and/or the base station can be reduced. However, this makes it more likely that a received signal will be erroneous. Such errors can lower the quality of the communication.

SUMMARY

The present application teaches a technique allowing adaptive decision and determination of parameters in a digital telephone system. More specifically, the present application enables at least one of the communicating stations to adaptively set a transmission value based on conditions. This allows the mobile station to request a maximum number of retransmissions that is less than its maximum allowable value.

A system is disclosed in which the base station and mobile station negotiate to determine a maximum number of allowable retransmissions. This maximum number of retransmissions is based on at least conditions in the mobile station.

BRIEF DESCRIPTION OF THE DRAWINGS

These and other aspects will now be described in detail with respect to the accompanying drawings, wherein:

FIGS. 3A and 3B show a third embodiment in which multiple items of information are sent; and FIG. 4 shows a system for a digital telephone with a base station and mobile station.

DETAILED DESCRIPTION

Figure 1A:
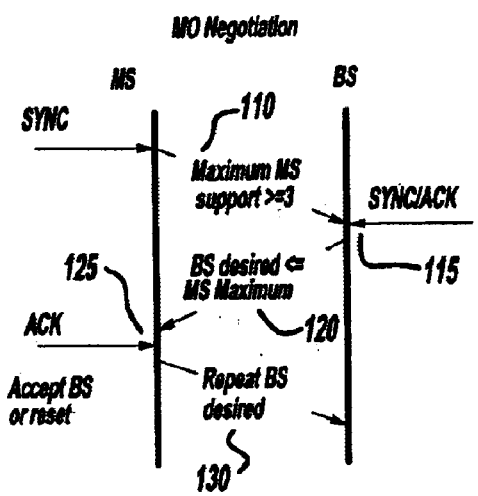
FIGS. 1A and 1B show a prior art system of negotiating and acknowledging the number of retransmissions.

All of the systems herein operate with the telephone system of the general type shown in FIG. 4. The mobile station 400 communicates with base station 450. MS 400 includes a processor 402 which carries out the operations and flowcharts described herein. The telephone also includes a user interface 404, as well as a display 401, a cellular transceiver 406. The processor communicates with memory 410, as well as other associated peripherals, using conventional techniques.

Figure 1B:
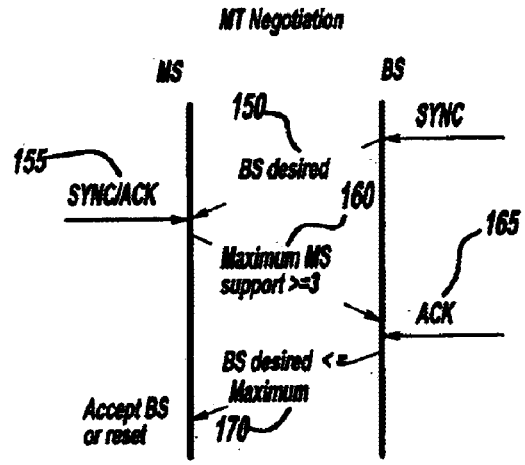
Figure 1C:
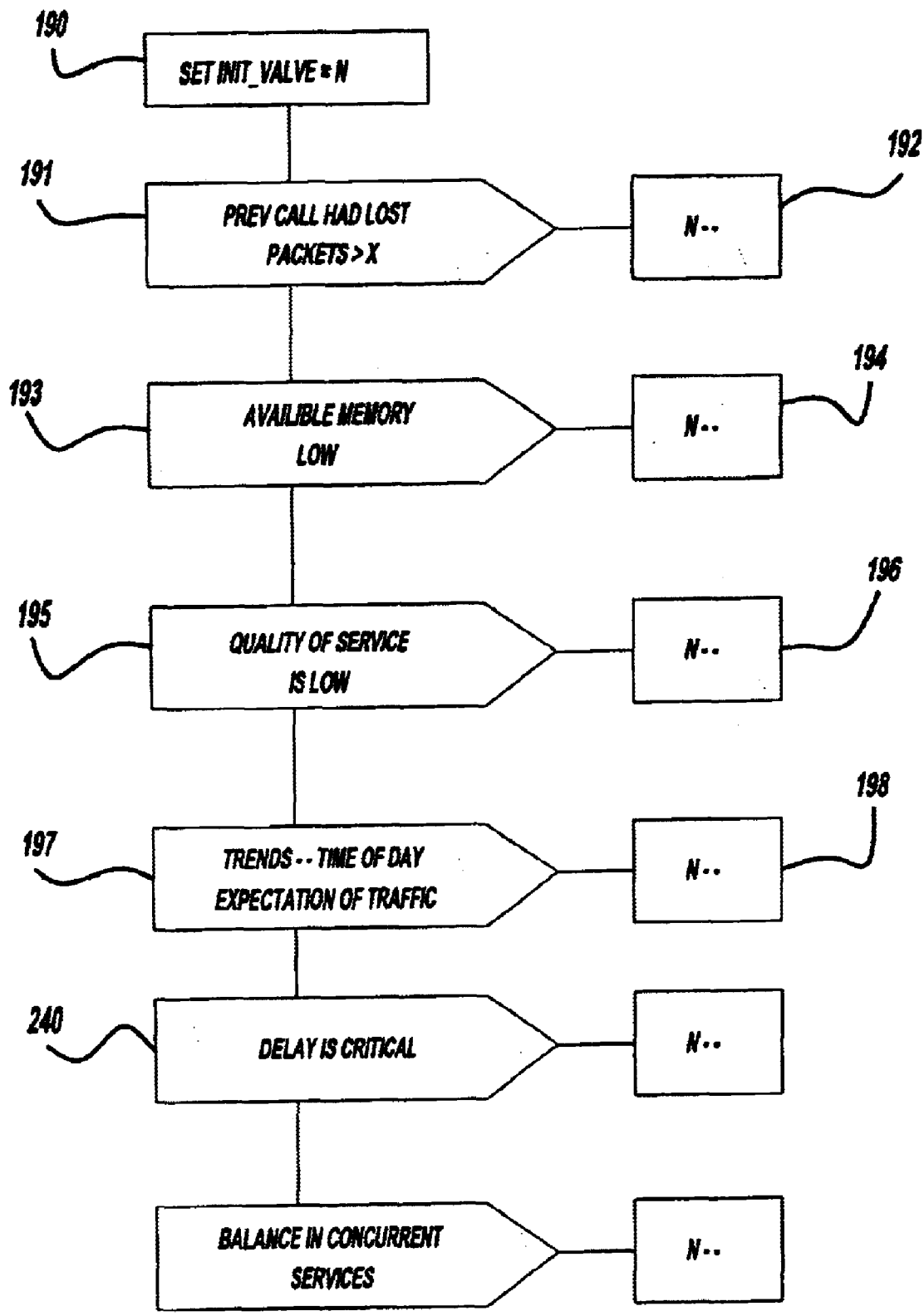
FIG. 1C shows a flowchart of detecting transmission conditions.

The process of FIG. 1C can be carried out by the processor running a stored program. This program shows detecting information in the telephone that indicates a condition of the telephone that is related to an amount of loading on the telephone and/or its memory.

FIGS. 1A and 1B show the current NAK parameter negotiation between the mobile station and base station of the mobile communication network. In FIG. 1A, the system shows the current MO negotiation for the mobile station placing a call to the base station. Step 110 indicates the mobile station 400 sending an initial synchronization request to the base station. This initial synchronization request indicates the value MS_MAXIMUM; the number that the mobile station can support. The standard requires that this maximum be greater than or equal to 3. This information is received by the base station at 115. The base station obtains a desirable retransmission figure BS_DESIRED. The base station sends the value BS_DESIRED to the mobile station at 120. Note that BS_DESIRED value must be less than or equal to the MS_MAXIMUM value. BS_DESIRED is received by the mobile station at 125. The mobile station then either accepts the base station's suggested value, or resets. A reset results in a failed call request. To accept the mobile station's request, the value of BS_DESIRED is repeated at 130. This completes the negotiation.

An analogous operation is carried out for MT negotiation, in which an incoming call is received from the base station to the mobile station. Here, the base station sends its BS_DESIRED value to the mobile station at step 150, received by the mobile station at 155. The mobile station responds at 160 by sending a value indicating the maximum that the mobile station (MS_MAXIMUM) at step 160. This value must be greater than 3. This is received by the base station at 165. Then, at 170, the base station sends its desired value, which is less than or equal to the maximum, to the mobile station. This is received at 180. The mobile station accepts this value or resets. As above, the acceptance is indicated by repeating.

As can be seen, the base station and mobile station agree how many packets can be retransmitted.

The present application uses an improved system shown in FIG. 2. This allows the mobile station to manage its own memory requirements and sets its own characteristics. This is done by allowing the mobile station to determine and specify a desired value, rather than its maximum value.

Figure 2A:
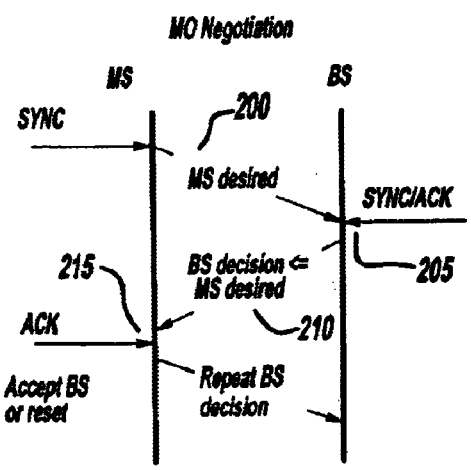
FIGS. 2A and 2B show a first embodiment in which a first improvement is obtained by sending a value that is based on current conditions instead of its maximum value.

The operation is shown in FIG. 2A. At step 200, the mobile station sends its desired, not maximum, value MS_DESIRED to the base station. The base station received the value at 205, and responds with a base station decision value BS_DECISION at 210. This value must be less than the mobile station desired value. The mobile station receives this at 215. The remaining steps of the process are similar to those discussed above in FIG. 1A.

This operation enables the mobile station to have some input into its own memory requirements.

The mobile station can decide this maximum based on a number of different factors. An exemplary routine is shown in FIG. 1C.

At step 190, the routine selects a nominal memory value, which may represent the maximum memory value or some lesser value. The nominal memory value may be, for example, 6.

The system then decrements this memory value by a specified amount for each of a plurality of conditions that are found to be true.

The first step at step 191 is the detection that the previous call had a number of lost packets, i.e. more lost packets than n. When this is determined, it may be taken as an indication that the link is so bad that many lost packets may still exist no matter what happens. Therefore, at step 192, the value of n is decreased. Note that FIG. 1C shows all of the values being decreased by the same amount. However a weighting factor can certainly be used to allow the different values to count more than other values.

At step 193, the system determines that the available memory in the telephone is low. When this happens, the memory requirement is reduced at step 194.

At step 195, the system determines that the quality of service is low. This could happen, for example, if the user has paid for a lower quality of service or the like. Again, this can result in a reduction of memory requirements at step 196.

Step 197 indicates a trend determination. The trend determination determines, from the time of day and other network parameters, whether is likely that the error rate will be high based on previous similar situations. If traffic is too high, then the user may lose packets in any case. This can therefore cause a reduction in the amount of desired memory at step 198.

At step 240, a situation is detected in which delay is critical. More retransmissions could cause a delay in the data signal. Therefore, if delay is critical, fewer retransmissions are made.

Figure 2B:
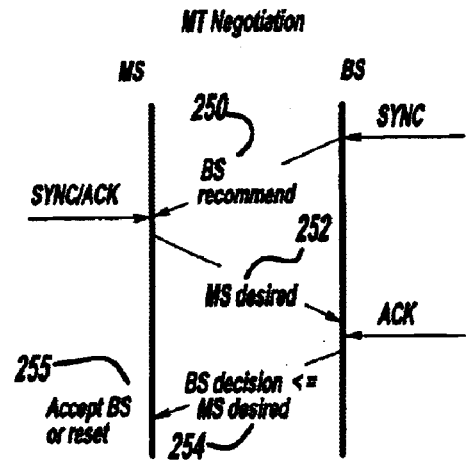

FIG. 2B shows the MT negotiation using "MS desired" parameter. In step 250 the base station recommends a value. The mobile station replies at step 252 with a desired value. The base station can use this value to make a decision less than the MS desired value. This can be accepted or rejected by the base station at step 255.

This system allows the advantages of using mobile station information in making its decision. The base station usually has no information about the mobile station. However, in this situation, the base station obtains input from the mobile station as part of its negotiation, and before agreeing on a value.

FIG. 3A shows yet another situation where the mobile station sends both the desired and the maximum value to the base station, providing even more information for the negotiation. FIG. 3B shows the analogous situation in which the base station recommends and the mobile station responds with both a desired and maximum value.

Although only a few embodiments have been disclosed above other embodiments and modifications of the above are contemplated.

What is claimed is:

1. A cellular telephone system, comprising:
   a mobile station that is operable to determine a desired number of retransmissions, where the desired number of retransmissions is based on an operational parameter associated with the mobile station and is less than a maximum number of retransmission that said mobile station is capable of accepting; and
   a base station capable of negotiating with said mobile station, the base station being adapted to receive said desired number of retransmission from said mobile station and operable to formulate a final negotiated number of allowable retransmissions using the desired number of retransmissions and the maximum number of allowable retransmissions.

2. A system as in claim 1, wherein said mobile station comprises a memory, operating to store received information; and a characteristic determining element which provides an output value indicating a desired amount of memory to be used for storing said information.

3. A system as in claim 2 wherein said characteristic determining element is a processor running a stored program.

4. A system as in claim 3 wherein said characteristic determining element detects that a previous call had an occurrence of lost packets greater than a certain amount.

5. A system as in claim 3 wherein said processor determines that an amount of available memory is lower than a specified value, and reduces said desired amount of memory responsive thereto.

6. A system as in claim 3 wherein said processor determines that a quality of service is low.

7. A system as in claim 3 wherein said processor determines trends of service that indicate a likely quality of service.

8. A system as in claim 3 wherein said processor determines a criticality of delay, and decreases said value to decrease an allowable delay.

9. A system as in claim 3 wherein said processor determines a plurality of concurrent services, each of which is using at least part of said memory.

10. A system as in claim 1 wherein said value represents a maximum number of retransmissions.

11. A method of operating a cellular telephone network, comprising:
    determining a maximum number of allowable retransmissions to a mobile station;
    calculating a desired number of retransmissions at the mobile station, wherein the desired number of retransmissions is based on an operational parameter associated with the mobile station;
    communicating the desired number of retransmissions and the maximum number of allowable retransmissions from the mobile station to a base station; and
    formulating a final negotiated number of allowable retransmissions using the desired number of retransmissions and the maximum number of allowable retransmissions.

12. A method as in claim 11 wherein said calculating comprising determining an amount of available memory.

13. A method as in claim 11 wherein said calculating comprises determining characteristics of previous transmissions.

14. A method as in claim 11 wherein said calculating composing determining a characteristic which indicates a current operation is sensitive to delay.

15. A method as in claim 11 wherein said calculating comprises determining that a plurality of concurrent services are running.

16. A method as In claim 11 further comprises sending the final negotiated number of allowable retransmission from the base station to the mobile station.

17. The method of claim 11 wherein the final negotiated number of allowable retransmissions is less than the desired number of allowable retransmissions.

18. The method of claim 11 wherein the final negotiated number of allowable retransmissions is less than the maximum number of allowable retransmissions.

* * * * *